(12) United States Patent
Kim et al.

(10) Patent No.: US 10,283,741 B2
(45) Date of Patent: May 7, 2019

(54) SECONDARY BATTERY

(71) Applicant: Samsung SDI Co., Ltd., Yongin-si, Gyeonggi-do (KR)

(72) Inventors: Jihyun Kim, Yongin-si (KR); Hyunki Jung, Yongin-si (KR); Hyorim Bak, Yongin-si (KR); Jungho Ha, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 129 days.

(21) Appl. No.: 15/360,794

(22) Filed: Nov. 23, 2016

(65) Prior Publication Data

US 2017/0155105 A1    Jun. 1, 2017

(30) Foreign Application Priority Data

Nov. 26, 2015  (KR) ........................ 10-2015-0166430

(51) Int. Cl.
  *H01M 4/02* (2006.01)
  *H01M 2/04* (2006.01)
  *H01M 2/12* (2006.01)
  *H01M 2/34* (2006.01)

(52) U.S. Cl.
  CPC ....... *H01M 2/0413* (2013.01); *H01M 2/1241* (2013.01); *H01M 2/345* (2013.01); *H01M 2200/20* (2013.01)

(58) Field of Classification Search
  CPC ...................................................... H01M 2/02
  See application file for complete search history.

(56) References Cited

U.S. PATENT DOCUMENTS

| 2010/0015508 | A1* | 1/2010 | Hwang | H01M 2/0426 429/56 |
| 2013/0344365 | A1* | 12/2013 | Haruna | H01M 10/0431 429/94 |
| 2014/0234689 | A1* | 8/2014 | Kim | B32B 9/045 429/120 |

FOREIGN PATENT DOCUMENTS

| KR | 2006-0114839 A | 11/2006 |
| KR | 2013-0090951 A | 8/2013 |
| KR | 2013-0090956 A | 8/2013 |

* cited by examiner

*Primary Examiner* — Jacob B Marks
(74) *Attorney, Agent, or Firm* — Knobbe, Martens, Olson & Bear LLP

(57) ABSTRACT

A secondary battery which can improve safety is provided. The secondary battery includes an electrode assembly, a can accommodating the electrode assembly and a cap assembly coupled to a top portion of the can, wherein the cap assembly comprises a cap-up, a safety vent installed under the cap-up, a cap-down installed under the safety vent, an insulator interposed between the safety vent and the cap-down, and a sub-plate positioned on a bottom surface of the cap-down, and an insulation layer is formed on a top surface of the cap-down.

20 Claims, 4 Drawing Sheets

SECONDARY BATTERY

CROSS-REFERENCE TO RELATED APPLICATION

This application claims priority to and the benefit of Korean Patent Application No. 10-2015-0166430 filed on Nov. 26, 2015 in the Korean Intellectual Property Office, and all the benefits accruing therefrom under 35 U.S.C. 119, the contents of which in its entirety are herein incorporated by reference.

BACKGROUND

Field

The present embodiments relate to a secondary battery.

Description of the Related Art

A secondary battery may have an increased internal pressure due to an increase in the internal temperature and generation of gases due to an abnormal state, such as short-circuiting or over-charging.

For example, if a lithium secondary battery is overcharged, an electrolyte may be decomposed to release gases, such as carbon dioxide or carbon monoxide, resulting in an increase in the internal pressure of the battery. In addition, if over-current flows through the battery due to over-discharging or short-circuiting, the internal pressure of the battery may rise, and the electrolyte may be converted into gases. Accordingly, the internal pressure and temperature may increase, causing safety-related problems, such as ignition, thereby raising significant safety concerns and considerably deteriorating battery performance and life characteristics.

SUMMARY

Embodiments herein provide a secondary battery which can improve safety.

The above and other aspects of the present embodiments will be described in or be apparent from the following description of example embodiments.

According to an aspect of the present embodiments, there is provided a secondary battery secondary battery includes an electrode assembly, a can accommodating the electrode assembly and a cap assembly coupled to a top portion of the can, wherein the cap assembly comprises a cap-up, a safety vent installed under the cap-up, a cap-down installed under the safety vent, an insulator interposed between the safety vent and the cap-down, and a sub-plate positioned on a bottom surface of the cap-down, and an insulation layer is formed on a top surface of the cap-down.

The insulation layer may be formed by performing anodizing treatment on the top surface of the cap-down.

The insulation layer may comprise aluminum oxide ($Al_2O_3$).

The insulation layer may be formed by coating a ceramic material on the top surface of the cap-down.

The ceramic material may include one selected from the group consisting of aluminum oxide ($Al_2O_3$), titanium dioxide ($TiO_2$), silicon dioxide ($SiO_2$), silicon carbide (SiC), silicon nitride ($Si_3N_4$) and equivalents thereof.

The insulation layer may have a thickness from about 0.5 μm to about 100 μm.

A ratio of a thickness of the cap-down to the thickness of the insulation layer may be 1:0.00125 to 1:0.25.

The insulation layer may be formed on the bottom surface of the cap-down.

The insulation layer may be formed at a region of the cap-down, except for the region of the cap-down connected to the sub-plate.

If the safety vent operates, a protruding part of the safety vent may be separated from the sub-plate and the insulation layer may insulate the safety vent and the cap-down from each other.

As described above, in the secondary battery according to an embodiments, the insulation layer is formed on a top surface of the cap-down, thereby insulating the safety vent and the cap-down from each other even if the insulator is burnt or melt by heat generated by an internal short circuit.

BRIEF DESCRIPTION OF THE DRAWINGS

The above and other features of the present embodiments will become more apparent by describing in detail example embodiments thereof with reference to the attached drawings in which.

DETAILED DESCRIPTION

Hereinafter, examples of embodiments will be described in detail with reference to the accompanying drawings such that they can easily be made and used by those skilled in the art.

Figure 1:
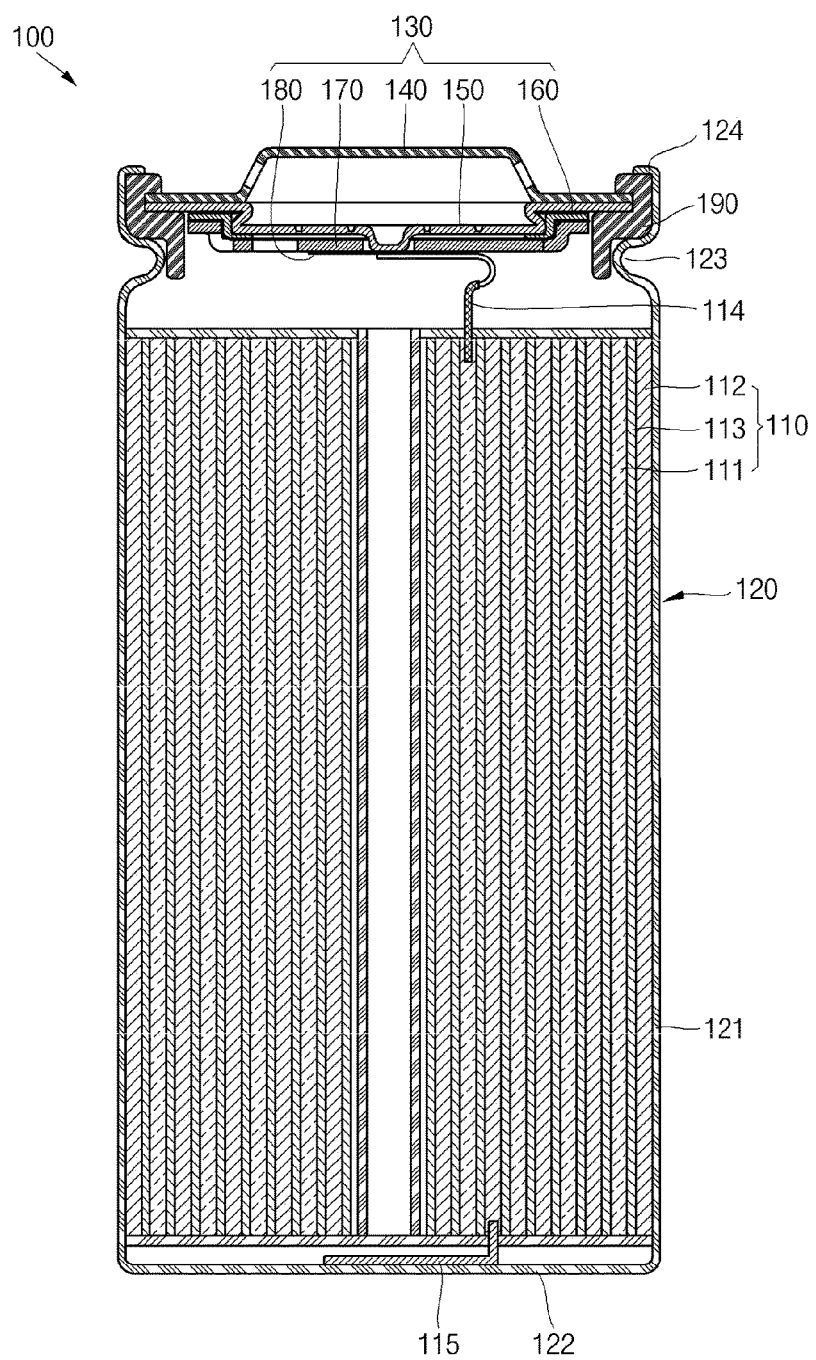
FIG. 1 is a perspective view of a secondary battery according to an embodiment.
Figure 2:
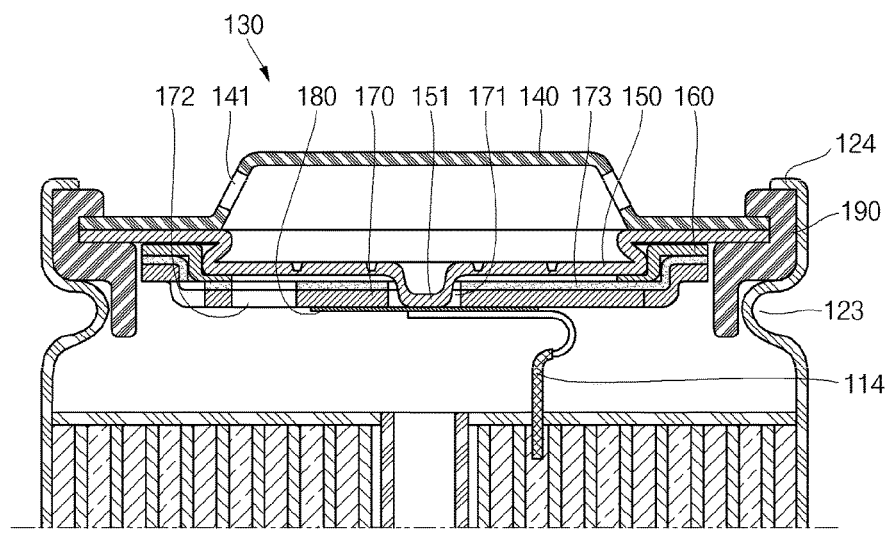
FIG. 2 is an enlarged cross-sectional view illustrating a cap assembly of FIG. 1.

FIG. 1 is a perspective view of a secondary battery according to an embodiment and FIG. 2 is an enlarged cross-sectional view illustrating a cap assembly of FIG. 1.

Referring to FIGS. 1 and 2, the secondary battery according to an embodiment includes an electrode assembly 110, a can 120 accommodating the electrode assembly 110, a cap assembly 130 coupled to a top opening of the can 120, and a gasket 190 sealing the can 120 and the cap assembly 130.

The electrode assembly 110 includes a first electrode plate 111, a second electrode plate 112 and a separator 113 interposed between the first electrode plate 111 and the second electrode plate 112. The electrode assembly 110 may be formed by winding a stacked structure including the first electrode plate 111, the separator 113 and the second electrode plate 112 in a jelly-roll configuration. Here, the first electrode plate 111 may function as a positive electrode and the second electrode plate 112 may function as a negative electrode.

The first electrode plate 111 is formed by coating a first electrode active material, such as a transition metal oxide, on a first electrode collector comprising a metal foil, such as an aluminum foil. A first electrode tab 114 is attached to the first electrode plate 111. One end of the first electrode tab 114 is electrically connected to the first electrode plate 111 and the other end of the first electrode tab 114 is upwardly protruded from the electrode assembly 110 to then be electrically connected to the cap assembly 130.

The second electrode plate 112 is formed by coating a second electrode active material, such as graphite or carbon, on a second electrode collector comprising a metal foil, such as a nickel or copper foil. A second electrode tab 115 is attached to the second electrode plate 112. One end of the second electrode tab 115 is electrically connected to the second electrode plate 112 and the other end of the second electrode tab 115 is downwardly protruded from the electrode assembly 110 to then be electrically connected to a bottom surface of the can 120.

The separator 113 is disposed between the first electrode plate 111 and the second electrode plate 112 to prevent a short circuit and allow movement of lithium ions. The separator 113 may comprise a polyethylene film, a polypropylene film, or a composite film including polyethylene and polypropylene.

The can 120 has a side surface plate 121, which is a cylindrical body having a predetermined diameter to form a space for accommodating the electrode assembly 110, and a bottom surface plate 122 sealing a bottom portion of the side surface plate 121. The top opening of the can 120 is opened to be sealed after the electrode assembly 110 is inserted into the can 120. In addition, a beading part 123 for preventing movement of the electrode assembly 110 is formed on the can 120. In addition, a crimping part 124 for fixing the cap assembly 130 and the gasket 190 is formed at a topmost end of the can 120.

The cap assembly 130 includes a cap-up 140, a safety vent 150 installed under the cap-up 140, a cap-down 170 installed under the safety vent 150, an insulator 160 interposed between the safety vent 150 and the cap-down 170, and a sub-plate 180 fixed on a bottom surface of the cap-down 170 to be electrically connected to the first electrode tab 114.

The cap-up 140 has a convexly formed top portion to be electrically connected to an external circuit. The cap-up 140 has a gas discharge hole 141 formed therein to provide a path through which gases generated in the can 120 are discharged. The cap-up 140 is electrically connected to the electrode assembly 110 and transmits the current generated from the electrode assembly 110 to the external circuit.

The safety vent 150 is shaped of a circular plate body corresponding to the cap-up 140 and has a protrusion part 151 downwardly protruding at its center. The safety vent 150 is electrically connected to the sub-plate 180 fixed to the bottom surface of the cap-down 170 using the protrusion part 151 passing through the throughhole 171 of the cap-down 170. Here, the protrusion part 151 of the safety vent 150 and the sub-plate 180 may be welded to each other by laser welding, ultrasonic welding, resistance welding or equivalents thereof.

The safety vent 150 is installed to make close contact with a portion of the cap-up 140, except for an upwardly protruding portion and allows internal gases to be discharged while cutting off the current when an abnormal internal pressure is generated from the can 120. If the internal pressure of the can 120 exceeds an operating pressure of the safety vent 150, the protrusion part 151 of the safety vent 150 upwardly protrudes by the gases discharged through the gas discharge hole 172 of the cap-down 170 to then be electrically disconnected from the sub-plate 180. Here, the safety vent 150 is electrically disconnected from the sub-plate 180 as a portion of the sub-plate 180 welded to the protrusion part 151 is broken. Then, when the internal pressure of the can 120 exceeds a rupture pressure, which is higher than the operating pressure of the safety vent 150, the safety vent 150 is ruptured.

The insulator 160 is interposed between the safety vent 150 and the cap-down 170 and insulates the safety vent 150 and the cap-down 170 from each other. The insulator 160 may comprise a resin material, such as polyethylene (PE), polypropylene (PP), or polyethylene terephthalate (PET).

The cap-down 170 is shaped of a circular plate body. A throughhole 171 is formed at the center of the cap-down 170, and the protrusion part 151 of the safety vent 150 passes through the throughhole 171. In addition, a gas discharge hole 172 is formed at one side of the cap-down 170 and allows internal gases to be discharged when excessive internal pressure is generated from the can 120. Here, the protrusion part 151 of the safety vent 150 upwardly protrudes by the gases discharged through the gas discharge hole 172 to then be separated from the sub-plate 180. In addition, an insulation layer 173 is formed on a top surface of the cap-down 170. The insulation layer 173 insulates the safety vent 150 and the cap-down 170 from each other. The insulation layer 173 will later be described in more detail.

The sub-plate 180 is positioned under the cap-down 170. The sub-plate 180 is welded between the protrusion part 151 of the safety vent 150 passing through the throughhole 171 of the cap-down 170 and the first electrode tab 114. Accordingly, the sub-plate 180 electrically connects the first electrode tab 114 and the safety vent 150 to each other. If the internal pressure of the can 120 increases, the protrusion part 151 of the safety vent 150 upwardly protrudes, thereby electrically disconnecting the sub-plate 180 and the safety vent 150 from each other.

The gasket 190 is installed in the top opening of the can 120. That is to say, the gasket 190 is assembled between outer circumferences of the cap-up 140 and the safety vent 150 and the top opening of the can 120. The gasket 190 may prevent the can 120 and the cap assembly 130 from being separated from each other.

Figure 3:
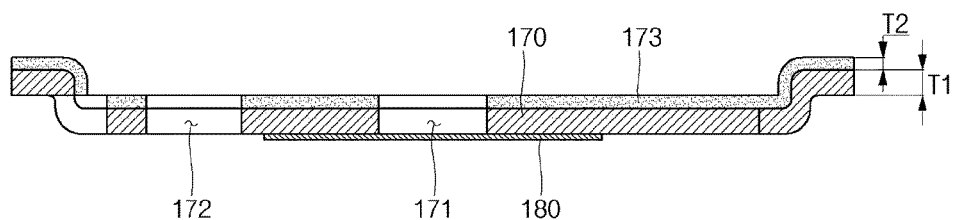
FIG. 3 is a cross-sectional view illustrating a cap-down in the secondary battery illustrated in FIG. 1.
Figure 4:
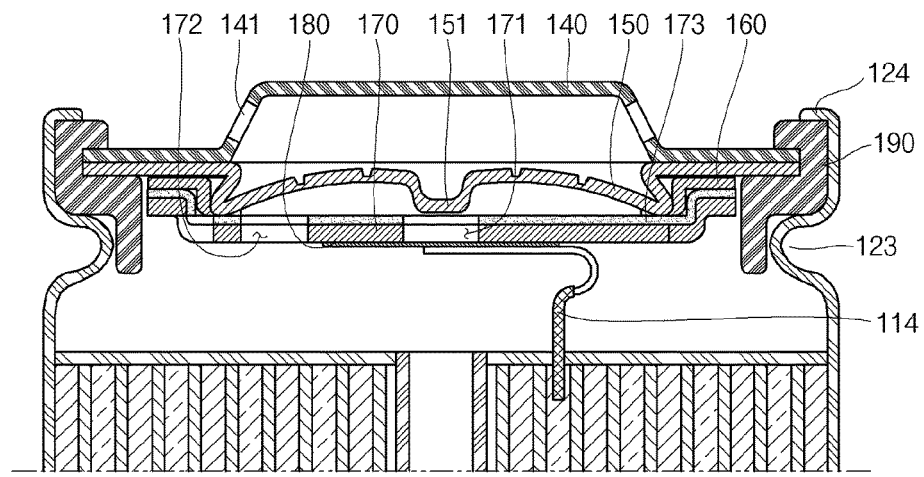
FIG. 4 is a cross-sectional view illustrating a state in which a safety vent operates due to an electrical short circuit occurs to the secondary battery illustrated in FIG. 1.

FIG. 3 is a cross-sectional view illustrating a cap-down in the secondary battery illustrated in FIG. 1 and FIG. 4 is a cross-sectional view illustrating a state in which a safety vent operates due to an electrical short circuit occurs to the secondary battery illustrated in FIG. 1.

Referring to FIG. 3, the insulation layer 173 is formed on a top surface of the cap-down 170. That is to say, the insulation layer 173 is positioned between the safety vent 150 and the cap-down 170 and insulates the safety vent 150 and the cap-down 170 from each other.

The insulation layer 173 may be formed by performing anodizing treatment on the top surface of the cap-down 170. Here, the anodizing treatment refers to a process of forming an oxide layer by oxidizing a surface of a metal plate. In general, the most typical material employed in the anodizing treatment is aluminum (Al). In addition, the anodizing treatment may also be performed on a metallic material, such as manganese (Mn), zinc (Zn), titanium (Ti), hafnium (Hf) or niobium (Nb). The oxide layer is very hard and has excellent resistance to corrosion and wear. For example, if the cap-down 170 comprising aluminum is suspended in an electrolytic solution and an anodizing current is applied to the electrolytic solution, a surface of the cap-down 170 reacts with oxygen of the electrolytic solution to then be gradually oxidized and aluminum oxide ($Al_2O_3$), i.e., the insulation layer 173, is formed on the oxidized portion. In addition, since the insulation layer 173 is formed only the top surface of the cap-down 170, it may not be exposed to the electrolyte by forming a mask pattern a bottom surface of the cap-down 170 before the anodizing treatment is performed.

In addition, the insulation layer 173 may be formed by coating a ceramic material on the top surface of the cap-down 170. Here, the ceramic material may include one selected from the group consisting of aluminum oxide ($Al_2O_3$), titanium dioxide ($TiO_2$), silicon dioxide ($SiO_2$), silicon carbide (SiC), silicon nitride ($Si_3N_4$) and equivalents thereof, but aspects of the present embodiments are not limited thereto.

The insulation layer 173 may have a thickness from approximately 0.5 μm to approximately 100 μm, preferably about 15 μm. If the thickness of the insulation layer 173 is smaller than 0.5 μm, insulation between the safety vent 150 and the cap-down 170 is not sufficiently performed, making it difficult to attain insulating performance. In addition, if the thickness of the insulation layer 173 is larger than 100 μm, the insulation layer 173 may become excessively thick, resulting in an increase in the weight of the secondary battery 100. In addition, a ratio of a thickness of the cap-down 170 and to the thickness of the insulation layer 173 may be about 1:0.00125 to about 1:0.25, preferably about 1:0.0375. As an example, if the thickness of the cap-down 170 is 0.4 mm, the insulation layer 173 may be formed to have a thickness of 15 μm.

In general, if a short circuit occurs to a secondary battery, the internal pressure may rise so that internal gases of the secondary battery are discharged through a gas discharge hole of a cap-down. Here, a protrusion part of a safety vent upwardly protrudes by the discharged gases, thereby electrically disconnecting the safety vent from a sub-plate to cut off the flow of current. However, an insulator positioned between the safety vent and the cap-down may be burnt or melt by heat generated during the short circuit of the secondary battery, so that the short circuit may occur between the safety vent and the cap-down. According to the present embodiments, as illustrated in FIG. 4, even if the insulator 160 is burnt or melt by the heat generated during the short circuit of the secondary battery 100 by forming the insulation layer 173 on the cap-down 170, the safety vent 150 and the cap-down 170 may be insulated from each other by the insulation layer 173. Therefore, the current flowing in the secondary battery 100 when the short circuit occurs to the secondary battery 100 according to the present embodiments can be perfectly cut off, thereby improving the safety of the secondary battery 100.

Figure 5:
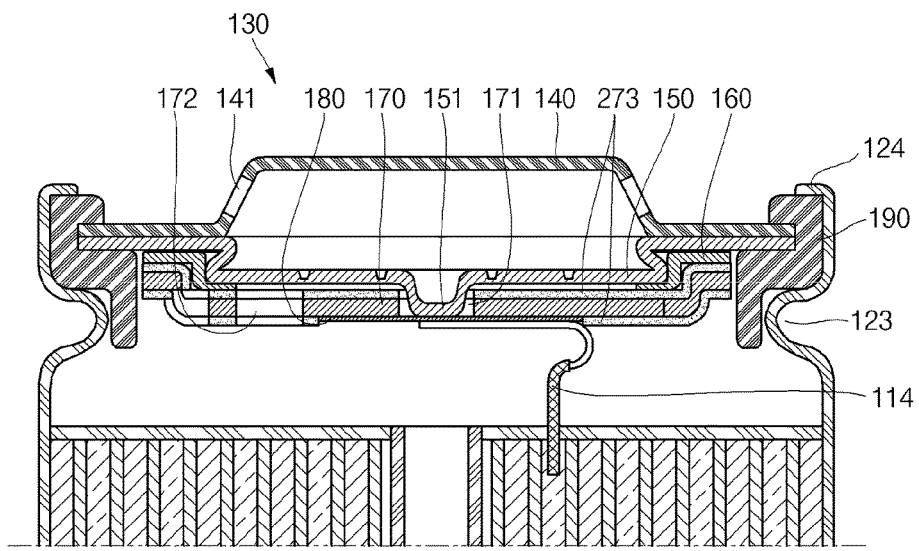
FIG. 5 is a partial cross-sectional view a secondary battery according to another embodiment.
Figure 6:
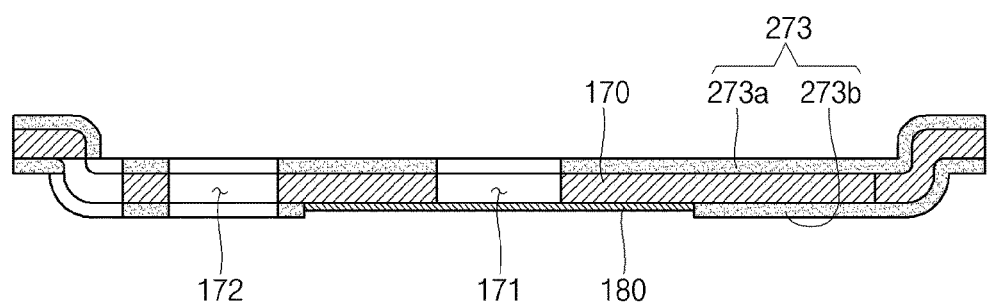
FIG. 6 is a cross-sectional view illustrating a cap-down in the secondary battery illustrated in FIG. 5.

FIG. 5 is a partial cross-sectional view a secondary battery according to another embodiment, and FIG. 6 is a cross-sectional view illustrating a cap-down in the secondary battery illustrated in FIG. 5.

The secondary battery illustrated in FIG. 5 is substantially the same as the secondary battery illustrated in FIG. 2, except for the position of an insulation layer, and the following description will focus on an insulation layer 273.

Referring to FIGS. 5 and 6, the insulation layer 273 is formed on top and bottom surfaces of the cap-down 170. That is to say, the insulation layer 273 includes a first insulation layer 273a formed on the top surface of the cap-down 170 and a second insulation layer 273b formed on the bottom surface of the cap-down 170. In particular, the first insulation layer 273a is positioned between the safety vent 150 and the cap-down 170 and insulates the safety vent 150 and the cap-down 170 from each other.

The insulation layer 273 may be formed by performing anodizing treatment on the top and bottom surfaces of the cap-down 170. For example, if the cap-down 170 comprising aluminum is suspended in an electrolytic solution and an anodizing current is applied to the electrolytic solution, a surface of the cap-down 170 reacts with oxygen of the electrolytic solution to then be gradually oxidized and aluminum oxide ($Al_2O_3$), i.e., the insulation layer 273, is formed on the oxidized portion. Here, since the insulation layer 273 is formed only on the cap-down 170, it may not be exposed to the electrolyte by forming a mask pattern at a portion of the cap-down 170 welded to the sub-plate 180 under the cap-down 170. That is to say, the insulation layer 273 is not formed at the portion of the cap-down 170 welded to the sub-plate 180.

In addition, the insulation layer 273 may be formed by coating a ceramic material on the top and bottom surfaces of the cap-down 170. Here, the ceramic material may include one selected from the group consisting of aluminum oxide ($Al_2O_3$), titanium dioxide ($TiO_2$), silicon dioxide ($SiO_2$), silicon carbide (SiC), silicon nitride ($Si_3N_4$) and equivalents thereof, but aspects of the present embodiments are not limited thereto.

Table 1 lists experimental data for insulating characteristics of an insulation layer. To conduct experiments, first, a cap assembly having a cap-down having an insulation layer formed on its top surface was prepared (Example 1), and a cap assembly having a cap-down having an insulation layer formed on its top and bottom surfaces was prepared (Example 2). Next, after a safety vent was forcefully operated in each of the cap assemblies, the safety vent was placed on a hot plate and resistance between the cap-down and the safety vent was measured while slowly raising temperatures. In addition, in order to ensure accuracy in measurement performed at various temperatures, the measurement was performed two times per measurement cycle.

TABLE 1

| Measurement Temperature | Measurement Cycle | Example 1 | Example 2 |
| --- | --- | --- | --- |
| 25° C. | 1st cycle | 1.9 MΩ | 2.0 MΩ |
|  | 2nd cycle | 2.0 MΩ | 1.8 MΩ |
| 100° C. | 1st cycle | 1.8 MΩ | 1.9 MΩ |
|  | 2nd cycle | 1.9 MΩ | 2.0 MΩ |
| 200° C. | 1st cycle | 2.1 MΩ | 2.0 MΩ |
|  | 2nd cycle | 1.9 MΩ | 1.8 MΩ |
| 300° C. | 1st cycle | 2.0 MΩ | 1.8 MΩ |
|  | 2nd cycle | 1.9 MΩ | 2.2 MΩ |
| 350° C. | 1st cycle | 1.8 MΩ | 1.9 MΩ |
|  | 2nd cycle | 2.1 MΩ | 2.1 MΩ |

As listed in Table 1, even if the temperature of the hot plate was raised (that is, even if heat was generated during a short circuit), the resistance values between the cap-down and the safety vent was about 1.8 MΩ to about 2.2 MΩ, suggesting that the cap-down and the safety vent were still insulated from each other. That is to say, it can be confirmed that the insulation layers 173 and 273 according to the present embodiments maintain insulating characteristics even at high temperatures without being deteriorated.

While the secondary battery of the present embodiments has been particularly shown and described with reference to example embodiments thereof, it will be understood by those of ordinary skill in the art that various changes in form and details may be made therein without departing from the spirit and scope of the present embodiments as defined by the following claims.

What is claimed is:

1. A secondary battery comprising an electrode assembly, a can accommodating the electrode assembly and a cap assembly coupled to a top portion of the can,
   wherein the cap assembly comprises:
   a cap-up, a safety vent under the cap-up, a cap-down under the safety vent, an insulator interposed between the safety vent and the cap-down, a sub-plate on a bottom surface of the cap-down, and an insulation layer on a top surface of the cap-down, wherein the insulation layer is interposed between the insulator and the cap-down and forms an overlapping portion that provides electrical isolation between the cap-down and the safety vent.

2. The secondary battery of claim 1, wherein the insulation layer is formed by performing anodizing treatment on the top surface of the cap-down.

3. The secondary battery of claim 2, wherein the insulation layer comprises aluminum oxide ($Al_2O_3$).

4. The secondary battery of claim 1, wherein the insulation layer comprises a ceramic material on the top surface of the cap-down.

5. The secondary battery of claim 4, wherein the ceramic material includes one selected from the group consisting of aluminum oxide ($Al_2O_3$), titanium dioxide ($TiO_2$), silicon dioxide ($SiO_2$), silicon carbide (SiC), silicon nitride ($Si_3N_4$) and combinations thereof.

6. The secondary battery of claim 1, wherein the insulation layer has a thickness from about 0.5 μm to about 100 μm.

7. The secondary battery of claim 1, wherein a ratio of a thickness of the cap-down to the thickness of the insulation layer is about 1:0.00125 to about 1:0.25.

8. The secondary battery of claim 1, wherein the insulation layer is on the bottom surface of the cap-down.

9. The secondary battery of claim 8, wherein the insulation layer is at a region of the cap-down, except for the region of the cap-down connected to the sub-plate.

10. The secondary battery of claim 1, wherein a protruding part of the safety vent is separated from the sub-plate and the insulation layer insulates the safety vent and the cap-down from each other.

11. A method of operating a secondary battery with an electrode assembly, a can accommodating the electrode assembly and a cap assembly coupled to a top portion of the can, the method comprising providing a cap-up on the cap assembly, a safety vent under the cap-up, a cap-down under the safety vent, an insulator interposed between the safety vent and the cap-down, a sub-plate on a bottom surface of the cap-down, and an insulation layer on a top surface of the cap-down, wherein the insulation layer is interposed between the insulator and the cap-down and forms an overlapping portion that provides electrical isolation between the cap-down and the safety vent, and operating the battery.

12. The method of claim 11, wherein the insulation layer is formed by performing anodizing treatment on the top surface of the cap-down.

13. The method of claim 11, wherein the insulation layer comprises aluminum oxide ($Al_2O_3$).

14. The method of claim 11, wherein the insulation layer is formed by coating a ceramic material on the top surface of the cap-down.

15. The method of claim 14, wherein the ceramic material includes one selected from the group consisting of aluminum oxide ($Al_2O_3$), titanium dioxide ($TiO_2$), silicon dioxide ($SiO_2$), silicon carbide (SiC), silicon nitride ($Si_3N_4$) and combinations thereof.

16. The method of claim 11, wherein the insulation layer has a thickness from about 0.5 μm to about 100 μm.

17. The method of claim 11, wherein a ratio of a thickness of the cap-down to the thickness of the insulation layer is about 1:0.00125 to about 1:0.25.

18. The method of claim 11, wherein the insulation layer is formed on the bottom surface of the cap-down.

19. The method of claim 18, wherein the insulation layer is formed at a region of the cap-down, except for the region of the cap-down connected to the sub-plate.

20. The secondary battery of claim 1, wherein if the safety vent operates, a protruding part of the safety vent separates from the sub-plate and the insulation layer insulates the safety vent and the cap-down from each other.

* * * * *